United States Patent
Faris et al.

(10) Patent No.: US 6,562,504 B2
(45) Date of Patent: *May 13, 2003

(54) METAL-AIR FUEL CELL BATTERY (FCB) ELECTRICAL POWER PRODUCING MODULE WITH MULTI-ELEMENT CATHODE STRUCTURE AND INSERTABLE METAL-FUEL CARD(S)

(75) Inventors: Sadeg M. Faris, Pleasantville; Tsepin Tsai, Peekskill, both of NY (US)

(73) Assignee: Reveo, Inc., Elmsford, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,155

(22) Filed: Oct. 18, 1999

(65) Prior Publication Data

US 2001/0008721 A1 Jul. 19, 2001

Related U.S. Application Data (63) Continuation of application No. 09/167,148, filed on Oct. 6, 1998, which is a continuation-in-part of application No. 09/110,761, filed on Jul. 3, 1998, and a continuation-in-part of application No. 09/110,762, filed on Jul. 3, 1998, and a continuation-in-part of application No. 09/074,337, filed on May 7, 1998, and a continuation-in-part of application No. 08/944,507, filed on Oct. 6, 1997, now Pat. No. 6,296,960.

(51) Int. Cl.[7] .......................... H01M 4/70; H01M 12/06

(52) U.S. Cl. ............................. 429/27; 429/66; 429/68; 429/208

(58) Field of Search .............................. 429/27, 66, 68, 429/80, 127, 208

(56) References Cited

U.S. PATENT DOCUMENTS

| 3,252,838 A | 5/1966 | Huber et al. |
| 3,260,620 A | 7/1966 | Gruber |
| 3,357,864 A | 12/1967 | Huber |

(List continued on next page.)

FOREIGN PATENT DOCUMENTS

GB     1176488     1/1970

OTHER PUBLICATIONS

Convert 3V to 5V Without Inductors by , Maxim Integrated Products; http://www.maxim–ic.com, vol. 92, 2000, p. 1–3, (Month Unknown).

Derive 5V From Four AA Cells by , Maxim Integrated Products; http://www.maxim.ic.com, vol. 128, 2000, p. 1–2, (Month Unknown).

Boost/Linear Regulator Derives 5B From Four Cells by , Maxim Integrated Products, http://www.maxim–ic.com, 2000 (Month Unknown).

Fuel Cell Technology & Applications, http://www.metallicpower.com/rtfuel.htm by , Metallic Power, Inc., 1999, (Month Unknown).

(List continued on next page.)

Primary Examiner—Stephen Kalafut
(74) Attorney, Agent, or Firm—Thomas J. Perkowski, Esq., P.C.; Ralph J. Crispino, Esq.

(57) ABSTRACT

A metal-air fuel cell battery (FCB) electrical power producing module for supplying electrical power to a host system that incorporates a module housing with a multi-element discharging head enclosed within the module housing and a recess formed therein into which a metal-fuel card can be slid for discharging. The module housing has a pair of electrical terminals for contacting the power terminals of a host system.

14 Claims, 9 Drawing Sheets

U.S. PATENT DOCUMENTS

| | | |
|---|---|---|
| 3,432,354 A | 3/1969 | Jost |
| 3,436,270 A | 4/1969 | Oswin et al. |
| 3,454,429 A | 7/1969 | Gruber .................. 136/86 |
| 3,532,548 A | 10/1970 | Stachurski |
| 3,536,535 A | 10/1970 | Lippincott |
| 3,577,281 A | 5/1971 | Pountney et al. |
| 3,663,298 A | 5/1972 | McCoy et al. |
| 3,717,505 A | 2/1973 | Unkle, Jr. et al. |
| 3,822,149 A | 7/1974 | Hale |
| 3,845,835 A | 11/1974 | Petit |
| 3,909,685 A | 9/1975 | Baker et al. |
| 3,928,072 A | 12/1975 | Gerbler et al. |
| 3,963,519 A | 6/1976 | Louie |
| 3,977,901 A | 8/1976 | Buzzelli |
| 4,052,541 A | 10/1977 | Von Krusenstierna |
| 4,152,489 A | 5/1979 | Chottiner |
| 4,172,924 A | 10/1979 | Warszawski |
| 4,246,324 A | 1/1981 | de Nora et al. |
| 4,331,742 A | 5/1982 | Lovelace et al. |
| 4,341,847 A | 7/1982 | Sammells |
| 4,551,399 A * | 11/1985 | Despic .................... 429/27 |
| 4,560,626 A * | 12/1985 | Joy ...................... 429/66 X |
| 4,626,482 A | 12/1986 | Hamlen et al. |
| 4,689,531 A | 8/1987 | Bacon |
| 4,693,946 A * | 9/1987 | Niksa et al. ............... 429/27 |
| 4,714,662 A | 12/1987 | Bennett |
| 4,828,939 A | 5/1989 | Turley et al. |
| 4,913,983 A | 4/1990 | Cheiky |
| 4,916,036 A | 4/1990 | Cheiky |
| 4,950,561 A | 8/1990 | Niksa et al. |
| 4,957,826 A | 9/1990 | Cheiky |
| 4,968,396 A | 11/1990 | Harvey |
| 5,121,044 A | 6/1992 | Goldman |
| 5,185,218 A | 2/1993 | Brokman et al. |
| 5,190,833 A | 3/1993 | Goldstein et al. |
| 5,196,275 A | 3/1993 | Goldman et al. |
| 5,242,765 A | 9/1993 | Naimer et al. |
| 5,250,370 A * | 10/1993 | Faris ...................... 429/68 |
| 5,260,144 A | 11/1993 | O'Callaghan |
| 5,306,579 A | 4/1994 | Shepard, Jr. et al. |
| 5,312,701 A | 5/1994 | Khasin et al. |
| 5,318,861 A | 6/1994 | Harats et al. |
| 5,328,777 A | 7/1994 | Bentz |
| 5,328,778 A | 7/1994 | Woodruff et al. |
| 5,354,625 A | 10/1994 | Bentz et al. |
| 5,360,680 A | 11/1994 | Goldman et al. |
| 5,362,577 A | 11/1994 | Pedicini |
| 5,366,822 A | 11/1994 | Korall et al. |
| 5,387,477 A | 2/1995 | Cheiky |
| 5,389,456 A | 2/1995 | Singh et al. |
| 5,405,713 A | 4/1995 | Pecherer et al. |
| 5,411,592 A | 5/1995 | Ovshinsky et al. |
| 5,418,080 A | 5/1995 | Korall et al. |
| 5,439,758 A | 8/1995 | Stone et al. |
| 5,447,805 A | 9/1995 | Harats et al. |
| 5,462,816 A | 10/1995 | Okamura et al. |
| 5,486,429 A | 1/1996 | Thibault |
| 5,512,384 A | 4/1996 | Celeste et al. |
| 5,525,441 A | 6/1996 | Reddy et al. |
| 5,532,086 A | 7/1996 | Thibault et al. |
| 5,536,592 A * | 7/1996 | Celeste et al. .......... 429/127 X |
| 5,554,452 A | 9/1996 | Delmolino et al. |
| 5,569,551 A | 10/1996 | Pedicini et al. |
| 5,582,931 A | 12/1996 | Kawahami |
| 5,599,637 A | 2/1997 | Pecherer et al. |
| 5,691,074 A | 11/1997 | Pedicini |
| 5,711,648 A | 1/1998 | Hammerslag |
| 5,721,064 A | 2/1998 | Pedicini et al. |
| 5,726,551 A | 3/1998 | Miyazaki et al. |
| 5,756,228 A | 5/1998 | Roseanou |
| 5,771,476 A | 6/1998 | Mufford et al. |
| 5,904,999 A | 5/1999 | Kimberg et al. |
| 5,978,283 A | 11/1999 | Hsu et al. |
| 6,057,052 A | 5/2000 | Shrim et al. |

OTHER PUBLICATIONS

Fuel Cells and Their Applications by Karl Kordesch and Gunter Simader, VCH Publishers, Inc., New York NY, Chapters 4.8.1–4.8.2, 1996, p. 158–162, (Month N.A.)

LBL Researchers Work on New Generation of Batteries by Jeffery Kahn, www.lbl.gov/Science–Articles/Archive/battery–development–at–lbl.html, 1990, p. 1–6, (Month Unknown).

Fabrication of Thin–Film Limn2O4 Cathodes for Rechargeable Microbateries by F.K. Shokoohi, et al., Applied Physics Letters, 1991, p. 1260–1262 (Sep.).

Battery Chargers by Mike Allen, Popular Mechanics, 1991, p. 30–31 (Sep.).

New Age EVs by Herb Schuldner, Popular Mechanics, 1991, p. 27–29 (Sep.).

Marketing Study for AER Energy Resources, Inc. by Authors not indicated, AER Energy Resources, Inc., 1991, p. 6–28 (Month Unknown).

Electric Car Showdown in Phoenix by Rick Cook, Popular Science, 1991, p. 64–65, 82 (Jul.).

Batteries for Cordless Appliances by Ralph J. Brodd, Ch. 3 of Batteries for Cordless Appliances, 1987, p. 49–59 (Month N/A).

PCT/US98/21257 Search Report, Apr. 1999.

PCT/US98/21260 Search Report, Feb. 1999.

PCT/US98/21256 International Search Report, Feb. 1999.

* cited by examiner

METAL-AIR FUEL CELL BATTERY (FCB) ELECTRICAL POWER PRODUCING MODULE WITH MULTI-ELEMENT CATHODE STRUCTURE AND INSERTABLE METAL-FUEL CARD(S)

RELATED CASES

This Application is a Continuation of co-pending U.S. application Ser. No. 09/167,148 entitled "METAL-AIR FCB-BASED POWER PRODUCING MODULES AND METAL-FUEL CARDS AND CATHODE CARTRIDGES FOR USE THEREWITH" by Sadeg M. Faris and Tsepin Tsai, filed Oct. 6, 1998, now U.S. Pat. No. 6,348,277; which is a Continuation-in-Part of the following U.S. applications: copending Application Ser. No. 09/110,761 entitled "METAL-AIR FUEL CELL BATTERY SYSTEM EMPLOYING A PLURALITY OF MOVING CATHODE STRUCTURES FOR IMPROVED VOLUMETRIC POWER DENSITY" filed Jul. 3, 1998 now U.S. Pat. No. 6,335,111; copending application Ser. No. 09/110,762 entitled "METAL-AIR FUEL CELL BATTERY SYSTEM EMPLOYING METAL-FUEL TAPE AND LOW-FRICTION CATHODE STRUCTURES" filed Jul. 3, 1998 now U.S. Pat. No. 6,299,997; copending application Ser. No. 09/074,337 entitled "METAL-AIR FUEL-CELL BATTERY SYSTEM HAVING MEANS FOR MANAGING AVAILABILITY OF METAL-FUEL THEREWITHIN" filed May 7, 1998; application Ser. No. 08/944,507 entitled "HIGH-POWER DENSITY METAL-AIR FUEL CELL BATTERY SYSTEM" by Sadeg Faris, et al. filed Oct. 6, 1997 (now U.S. Pat. No. 6,296,960), said application being assigned to Reveo, Inc. and incorporated herein by reference in its entirety.

BACKGROUND OF THE INVENTION

1. Field of the Invention

The present invention relates to improved methods, systems and devices for producing electrical power from metal-air fuel cell battery (FCB) systems and devices.

2. Description of the Prior Art

In U.S. Pat. No. 6,296,960, Applicant discloses several types of novel metal-air fuel cell battery (FCB) systems. During power generation, metal-fuel tape is transported over a stationary cathode structure in the presence of an ionically-conducting medium, such as an electrolyte-impregnated gel. In accordance with well known principles of electro-chemistry, the transported metal-fuel tape is oxidized as electrical power is produced from the system.

Metal-air FCB systems of the type disclosed in U.S. Pat. No. 6,296,960 have numerous advantages over prior art electro-chemical discharging devices. For example, one advantage is the generation of electrical power over a range of output voltage levels required by particular electrical load conditions. Another advantage is that oxidized metal-fuel tape can be repeatedly reconditioned (i.e. recharged) during battery recharging cycles carried out during electrical discharging operation, as well as separately therefrom.

In U.S. Pat. No. 5,250,370, Applicant discloses an improved system and method for recharging oxidized metal-fuel tape used in prior art metal-air FCB systems. By integrating a recharging head within a metal-air FCB discharging system, this technological improvement theoretically enables quicker recharging of metal-fuel tape for reuse in FCB discharging operations. In practice, however, there are many contemplated applications where metal-fuel in the form of tape may not be desirable by virtue of the fact that special mechanisms are typically required to transport the metal-fuel tape through the system, during discharging and recharging modes of operation.

Thus there is a great need in the art for an improved method and apparatus for producing electrical power using metal-fuel FCB technology while overcoming the shortcomings and limitations of prior art technologies.

OBJECTS AND SUMMARY OF THE INVENTION

Accordingly, a primary object of the present invention is to provide an improved method and apparatus of producing electrical power from metal-air fuel cell batteries (FCB) in a manner which avoids the shortcomings and drawbacks of prior art technologies.

Another object of the present invention is to provide such a system, wherein one or more metal-fuel cards are discharged during the power generation process.

Another object of the present invention is to provide a metal-air FLB power generation module of compact construction for providing electrical power to a host system having a battery storage compartment.

Another object of the present invention is to provide such a power generation module comprising a module housing of compact construction, a discharging head enclosed within the module housing and into which a metal-fuel card can be slid for discharging, and wherein the module housing has a pair of electrical terminals for contacting the power terminals of a host system when the module housing is loaded into the battery storage compartment of the host system.

Another object of the present invention is to provide such a FCB power generation module, wherein host systems can be any appliance, electronic device, system or instrument requiring electrical power for its operation.

Another object of the present invention is to provide a metal-air FCB power generation module adapted for insertion within the battery storage compartment of a conventional consumer electronic device, battery-powered toy, electronic instrument, or any other battery-powered device requiring DC electrical power for its operation.

Another object of the present invention is to provide such a FCB power generating module having the form factor of virtually any conventional battery power source (e.g. two AA batteries, four AAA batteries, one 9volt battery, two C batteries, etc.)

Another object of the present invention is to provide a storage case for displaying a plurality of metal-fuel cards (and possibly a replacement cathode cartridge) in a store during sale, and for storing such components in a shirt pocket, brief case, purse or other carrying device for subsequent use when additional metal-fuel is required for the continuous production of electrical power from the FCB power generation module.

Another object of the present invention is to provide such a FCB power generation module, wherein a double-sided metal-fuel card is disposed between a pair of cathode structures within an ultra-compact module housing having a form factor of a conventional battery type.

Another object of the present invention is to provide a rechargeable metal-air FCB power generation module for use in diverse types of systems and devices.

Another object of the present invention is to provide such a FCB power generation module, wherein a plurality of cathode/anode structures are arranged within a module housing having a cover designed to allow air to pass to the cathode structures.

Another object of the present invention is to provide such a FCB power generation module, wherein the output power voltage is user-selectable by way of a switch located in the exterior of the module housing.

Another object of the present invention is to provide such a system, wherein the metal-fuel cards to be discharged comprises multiple metal-fuel tracks for use in generating different output voltages from a metal-air FCB subsystem.

These and other objects of the present invention will become apparent hereinafter.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 2A is an exploded perspective view of the metal-air FCB power producing module of FIG. 1B, wherein the upper housing portion is detached from the lower housing portion to reveal that the four-element cathode structure (i.e. submodule) releasably inserted within a recess formed in the lower housing portion, adjacent a pair of printed circuit (PC) boards connected by way of a flexible circuit, as well as a four-element anode contacting structure integrally formed in the upper housing portion and a first storage recess formed when the upper and lower housing portions are snap-fitted together for slidable receipt of a single cathode structure of the type shown in FIG. 2B so that its edge located conductive elements engage respective conductive elements on the first PC board, and a second storage recess formed for slidable receipt of a single-sided metal fuel card of the type shown in FIG. 2C so that its edge-located conductive elements engage with the respective conductive elements on the first PC board;

DETAILED DESCRIPTION OF THE ILLUSTRATIVE EMBODIMENTS OF THE PRESENT INVENTION

Referring now to the figures in the accompanying Drawings, the illustrative embodiments of the present invention will now be described in great technical detail, wherein like elements are indicated by like reference numbers.

In general, many of the metal-air FCB-based systems according to the present invention can be compartmentalized into a number of subsystems including, for example: a Metal-Fuel Loading Subsystem, a Metal-Fuel Discharging Subsystem, and optionally, a Metal-Fuel Recharging Subsystem. The function of the Metal-Fuel Loading Subsystem is to load metal-fuel material, in the form cards, sheets and the like, to the Metal-Fuel Discharging Subsystem. When loaded within the Metal-Fuel Discharge Subsystem, the metal-fuel is discharged by (i.e. electro-chemical reaction with) one or more discharging heads in order produce electrical power across an electrical load connected to the subsystem while $H_2O$ and $O_2$ are consumed at the cathode-electrolyte interface during the electro-chemical reaction. When loaded into the Metal-Fuel Recharging Subsystem, discharged metal-fuel is recharged by one or more recharging heads in order to convert the oxidized metal-fuel material into its source metal material suitable for reuse in power discharging operations, while $O_2$ is released at the cathode-electrolyte interface during the electro-chemical reaction. The electro-chemistry upon which such discharging and recharging operations are based is described in Applicant's U.S. Pat. No. 6,296,960, U.S. Pat. No. 5,250,370, and other applied science publications well known in the art. These applied science principles will be briefly summarized below.

During discharging operations within metal-air FCB systems, metal-fuel such as zinc, aluminum, magnesium or beryllium is employed as an electrically-conductive anode of a particular degree of porosity (e.g. 50%) which is brought in "ionic-contact" with an electrically-conductive oxygen-pervious cathode structure of a particular degree of porosity, by way of an ionically-conductive medium such as an electrolyte gel, KOH, NaOH or ionically-conductive polymer. When the cathode and anode structure are brought into ionic contact, a characteristic open-cell voltage is automatically generated. The value of this open-cell voltage is based on the difference in electro-chemical potential of the anode and cathode materials. When an electrical load is connected across the cathode and anode structures of the metal-air FCB cell, so constructed, electrical power is delivered to the electrical load, as oxygen $O_2$ from the ambient environment is consumed and metal-fuel anode material oxidizes. In the case of a zinc-air FCB system or device, the zinc-oxide (ZnO) is formed on the zinc anode structure during the discharging cycle, while oxygen is consumed at within the region between the adjacent surfaces of the cathode structure and electrolytic medium (hereinafter referred to as the "cathode-electrolyte interface" for purposes of convenience).

During recharging operations, the Metal-Fuel Recharging Subsystem hereof applies an external voltage source (e.g. more than 2 volts for zinc-air systems) across the cathode structure and oxidized metal-fuel anode of the metal-air FCB system. Therewhile, the Metal-Fuel Recharging Subsystem controls the electrical current flowing between the cathode and metal-fuel anode structures, in order to reverse the electro-chemical reaction which occurred during discharging operations. In the case of the zinc-air FCB system or device, the zinc-oxide (ZnO) formed on the zinc anode structure during the discharging cycle is converted into (i.e. reduced back) into zinc, while oxygen $O_2$ is released at the cathode-electrolyte interface to the ambient environment.

Specific ways and means for optimally carrying out such discharging (and optional recharging) processes in metal-air FCB systems and devices will be described in detail below in connection with the various illustrative embodiments of the present invention.

In general, the designs, structures and inventive principles embodied within the system embodiments shown in FIGS. 1 through 6A of Applicant's co-pending U.S. application Ser. No. 09/167,148 filed Oct. 6, 1998, incorporated herein by reference, can be used to create various types of metal-air FCB power producing (i.e. generating) modules adapted for insertion within the battery storage compartment of electric appliances, systems, devices and the like. Examples of such FCB power generating modules comprise, in general: a module housing; a discharging head enclosed within the module housing and into which one or more metal-fuel cards can be slid for discharging; and wherein the module housing has a pair of electrical terminals for contacting the power terminals of a host system when the module housing is loaded into the battery storage compartment thereof. The overall size of the module in any particular application need not be any larger than the dimensions of the battery compartment into which it is to be installed. The host system into which a metal-air FCB power producing module hereof can be loaded may be any type of appliance, electronic device, electronic system or electronic/opto-electronic instrument requiring electrical power input at a particular voltage range for its operation. The details of these metal-air FCB power producing modules of the present invention will be described hereinbelow.

Figure 1A:
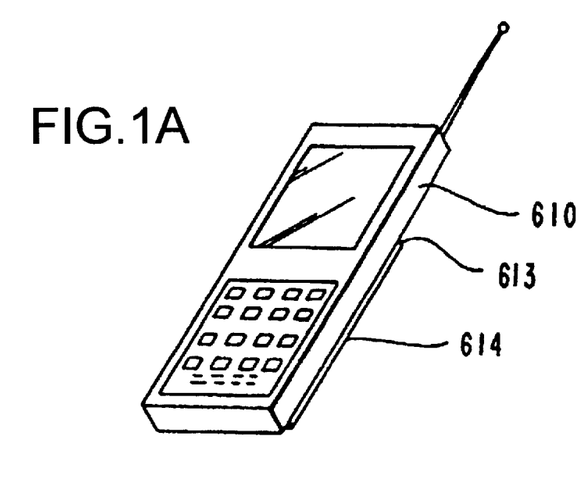
FIG. 1A is a perspective view of a hand-held cellular phone containing a metal-air FCB power producing module of the present invention in its battery storage compartment, while carrying a plurality of extra metal-fuel cards within a storage compartment adhesively affixed to the exterior of the hand-held cellular phone.
Figure 1B:
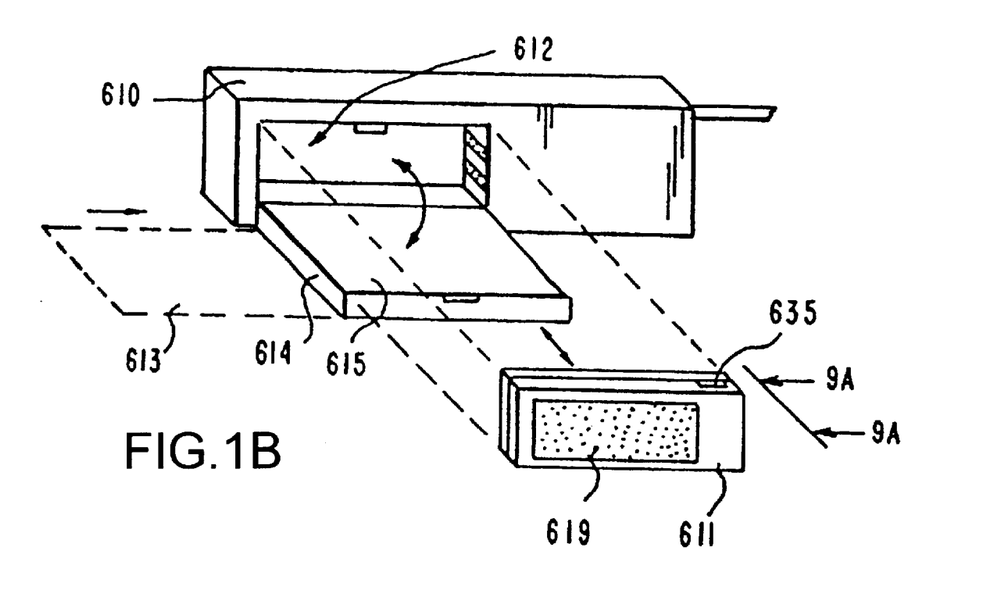
FIG. 1B is a partially-exploded perspective view of the cellular phone of FIG. 1A, showing its battery storage compartment panel removed (i.e. opened) and a metal-air FCB power producing module (loaded with a metal-fuel card) being inserted within the battery storage compartment of the cellular phone, and several extra metal-fuel cards inserted within the fuel card storage compartment affixed to the exterior surface of the battery storage compartment cover panel.

In FIGS. 1A and 1B, there is shown a hand-held cellular phone 610 containing a metal-air FCB power producing module 611 within battery storage compartment 612 of the cellular phone. Notably, in this illustrative embodiment, the metal-air FCB module 611 is not equipped with a Metal-Fuel Recharging Subsystem, but only a Metal-Fuel Discharging Subsystem. As such, a plurality of extra metal-fuel cards 613 can be provided within a storage compartment (or card holder) 614 that is adhesively affixed to the exterior surface of the battery compartment cover panel 615. It is understood, however, that in an alternative embodiment of the metal-air FCB module 611, a Metal-Air Recharging Subsystem can be incorporated within the module to enable the loaded metal-fuel card(s) to be recharged. In such alternative embodiments, the cathode structure would function as a discharging cathode during discharging operations, and as a recharging cathode during recharging operations.

In FIG. 1B, the battery storage compartment cover panel 615 is shown open with a metal-air FCB power producing module (loaded with a metal-fuel card) inserted into (or withdrawn from) the battery storage compartment 612. In alternative embodiments of the present invention, the card storage compartment 614 can be integrally formed within the power consuming device. As will be described below, this FCB producing module employs passive diffusion of ambient air ($O_2$) to the cathode structure, rather than actively forced or otherwise controlled air flow thereto during discharging operations. This approach simplifies the construction and cost of the FCB power producing module shown in FIG. 1B without compromising its performance in the low power applications for which it has been designed.

Figure 2A:
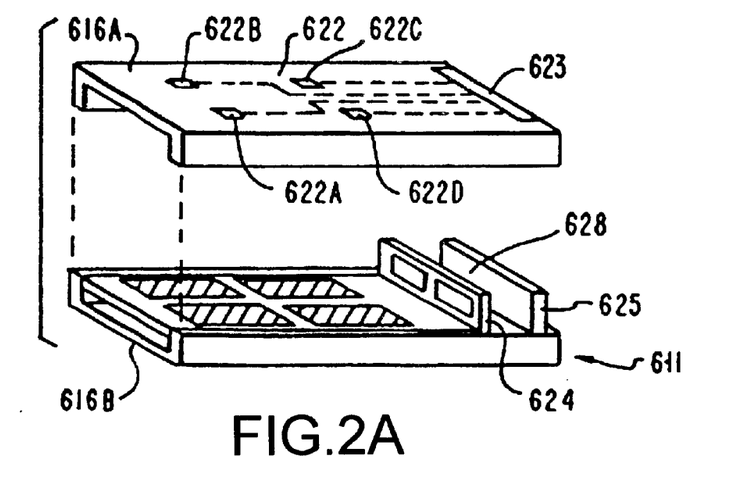
FIG. 2B is a perspective view of cathode structure (i.e. submodule) adapted for slidable insertion into the first storage recess formed in the metal-air FCB power producing module shown in FIGS. 1B and 2A.
FIG. 2C is a perspective view of a four-element metal-fuel card adapted for slidable insertion into the second storage recess formed in the metal-air FCB power producing module shown in FIGS. 1B and 2A.
Figure 2B:
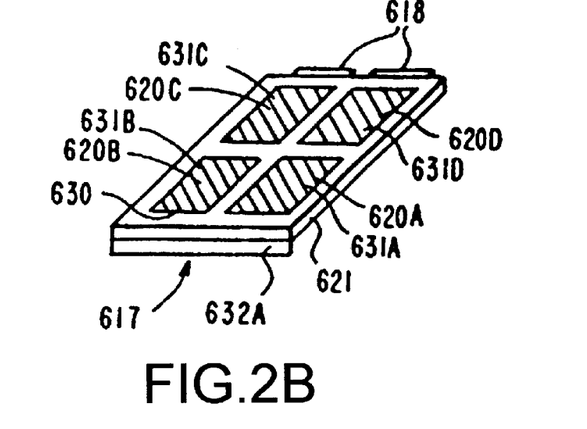
Figure 2C:
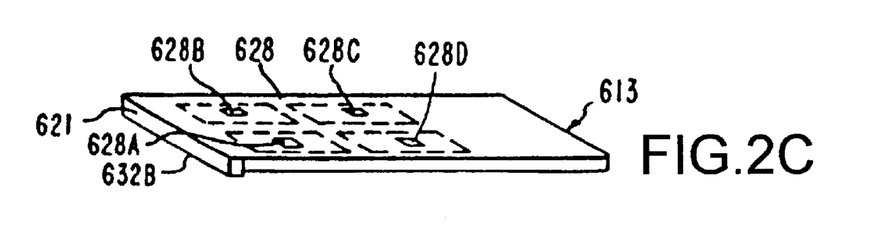
Figure 3A:
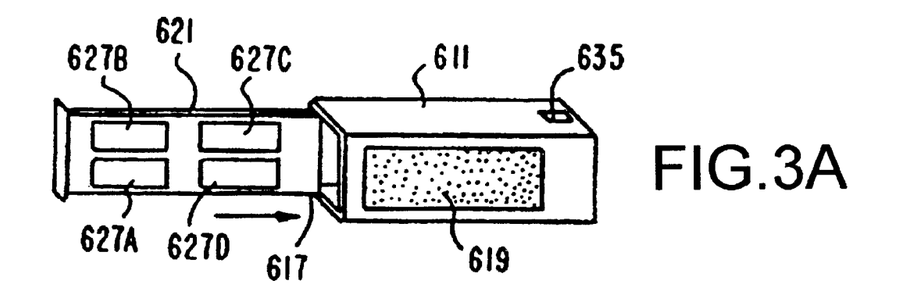
FIG. 3A is a perspective view of the metal-air FCB power producing module of FIG. 1B shown removed from its battery storage compartment formed in the cellular phone of FIG. 1A.
Figure 3B:
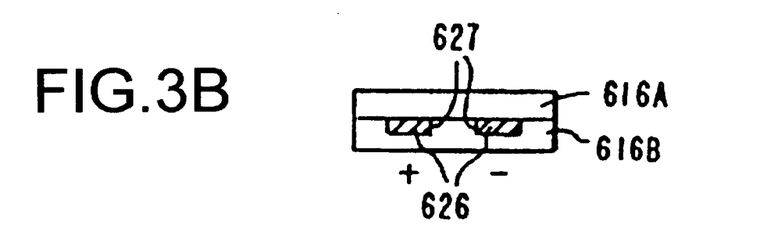
FIG. 3B is an elevated side view of the metal-air FCB power producing module of FIG. 1B, showing its output power terminals exposed for contact with mated power receiving terminals located within the battery storage compartment of the host device (e.g. cellular phone, CD-ROM player, etc.)

As shown in FIGS. 2A through 3B, the FCB power producing module 611 comprises: an upper housing portion 616A (releasable) detachable from a lower housing portion 616B; a four-element cathode structure (i.e. submodule or cartridge) 617 releasably inserted within a recess formed in the lower housing portion 616B and terminating in a first electrical connector 618; an air-pervious panel 619 formed in the bottom side surface of the lower housing portion 616B for allowing ambient air to flow through the cathode elements 620A through 620D provided in cathode structure 617; a four-element anode contacting structure 622 integrally formed in the upper housing portion, including a plurality of spring-biased electrical contacts 622A through 622D which are electrically connected to and terminated in a second electrical connector 623 by way of a plurality of electrical connectors known in the art; a first printed circuit (PC) board 624 mounted within the lower housing portion, for carrying electronic circuitry necessary to realize the various subsystems depicted in FIG. 2A required for the passive-air type FCB module of FIG. 1B, as well as providing electrical connectors for establishing electrical contact with the first and second electrical connectors 618 and 623 associated with the cathode cartridge 617 and the anode contacting structure 622; a second PC board 625 for supporting a pair of output power terminals 626 and electronic circuitry necessary for realizing an output terminal reconfiguration subsystem, an output power control subsystem and other subsystems depicted in FIG. 2A; a pair of output power ports 627 for projection of output power terminals 626 on second PC circuit board 625 through the lower housing portion; a flexible circuit 629 for establishing electrical connections between first and second PC boards 624 and 625 and a single-sided metal fuel card 613 for carrying a plurality of metal fuel elements 627A through 627D upon an ultra-thin frame or support structure 628 and having apertures 628A through 628D which allow the plurality of spring-biased electrical contacts 622A through 622D to engage a respective metal-fuel element 627A through 627D when the metal-fuel card is slid 613 within the recess formed between the anode contacting structure 622 and the cathode structure 617 when the upper and lower housing portions are snapfitted together as shown in FIGS. 1B and 3A.

As shown in FIG. 2B, the cathode cartridge 617 comprises a support frame 621 with a plurality of recesses 630 each having a perforated bottom support surface to enable passive air diffusion. Each cathode element 620A through 620D and electrolyte-impregnated pad 631A through 631D disposed thereon can be constructed as described hereinabove. The edge-located conductive elements 618 on the cathode cartridge engage respective conductive elements associated with the first connector provided on the first PC board 624 when the cathode cartridge is connected slidably (or drop-in) inserted into the first storage recess formed in the metal-air FCB power producing module, as shown in FIG. 2A.

As shown in FIG. 2C, each metal-fuel card 613 comprises a plurality of metal fuel elements 627A through 627D supported within a plurality of recesses formed in a ultra-thin substrate 628. Each recess on the substrate 628 has an aperture formed therein to allow a spring-biased electrical contact 622A–622D associated with the anode contacting structure to establish electrical contact with a metal-fuel element as the metal fuel card is slid within the second recess formed between the cathode cartridge and the anode contacting structure when the upper and lower housing portions are brought together in a snap-fit manner, as shown in FIG. 3A.

Preferably, the outer edge portions 623A (and 623B) or of the cathode cartridge metal-fuel card are each adapted to form a vapor tight seal with the module housing when the cartridge and card are loaded within the module housing, as shown in FIG. 1B. This will prevent the electrolyte from evaporating prior to discharging operations. Optionally, a small reservoir of water or electrolyte make-up solution can be encapsulated within support plate of the cathode cartridge 617 and distributed to the electrolyte pads via micro conduits formed along the substructure. The electrolyte supply can protrude from the surface of the cathode cartridge surface, on the side thereof which contacts metal-fuel card so that the metal fuel card exerts force on the protrusion when the metal fuel card is loaded in the FCB module. The protrusion structure can be similar to the bulbous structure provided in conventional devices used to package and dispense saline solution to human eyes by squeezing action upon the dispenser. As electrolyte is consumed during discharging operations, additional electrolyte is automatically withdrawn from the electrolyte reservoir within the cathode cartridge by way of pressure exerted upon the cathode substrate by the metal fuel card loaded within the FCB module. It is understood, however, that there are numerous other ways of providing an ionically-conducting medium between each cathode element and metal-fuel element within the FCB module. Such alternative techniques might include ionically-conducting polymers having a lifecycle engineered for 20 or more metal-fuel cards prior to requiring replacement. Even in such embodiments, it may be desired to supply a sufficient amount of $H_2O$ at the interface between the anode and ionically-conductive medium. The above-described fluid dispensing technique can be used in such instances.

As the FCB power generation module of FIGS. 1B and 2A employs a multi-element cathode/anode construction, it is capable of producing electrical power over a range of different output voltages controlled by the output terminal reconfiguration subsystem thereof. In the preferred embodiment, the output voltage of the FCB producing module is selected by a multi-position switch 235 located on the exterior of the module housing, as shown in FIGS. 1B and 3A.

Figure 4:
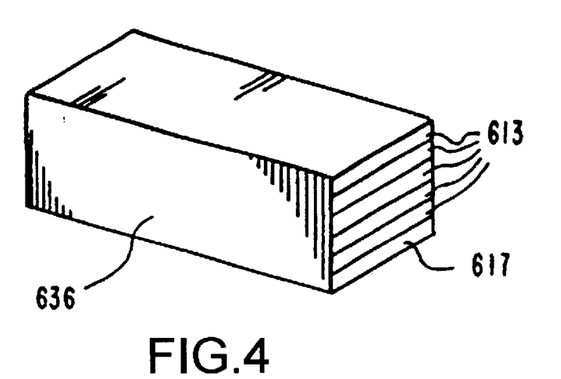
FIG. 4 is a perspective view of a first embodiment of the cathode-cartridge/metal-fuel card storage device of the present invention realized in the form of a box-like structure having a plurality of recesses for slidably receiving and holding a single (replacement) cathode cartridge and a plurality of (charged) metal-fuel cards for use within the FCB power producing module of FIG. 1B.
Figure 5A:
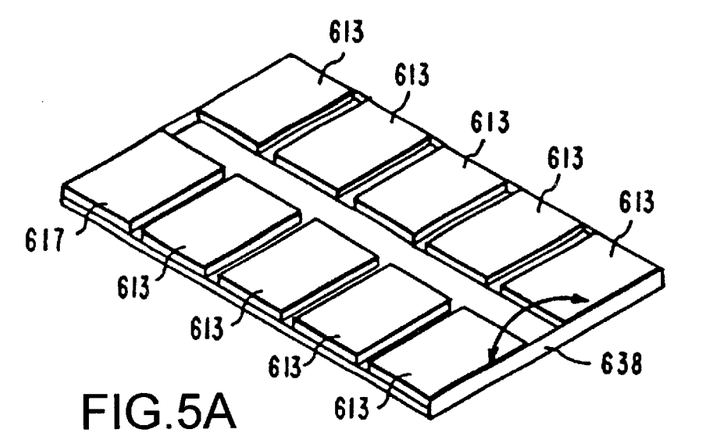
FIG. 5A is a perspective view of a second embodiment of the cathode-cartridge/metal-fuel card storage device of the present invention realized in the form of a wallet-like structure, arranged in its open configuration, and having a plurality of slots for slidably receiving and holding a single (replacement) cathode cartridge and a plurality of (charged) metal-fuel cards for use within the FCB power producing module of FIG. 1B.
Figure 5B:
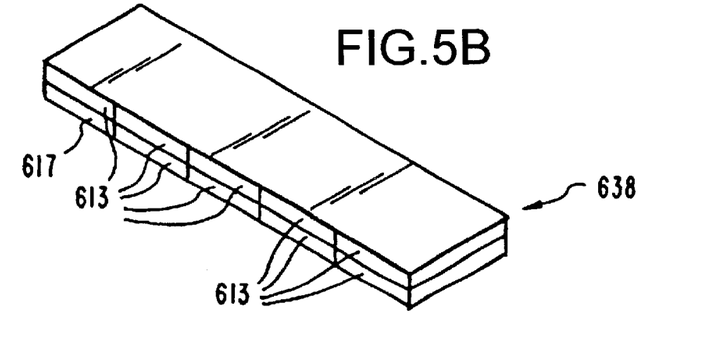
FIG. 5B is a perspective view of the cathode-cartridge/metal-fuel card storage device of FIG. 5A, shown arranged in its closed/storage configuration.

As shown in FIGS. 4 through 5B, a (single) replacement cathode cartridge 617 and a plurality of metal-fuel cards 613 can be held within a storage device 636 during packaging/mechanizing and post-purchase storage and use. In the first illustrative embodiment shown in FIG. 4, the storage device is realized in the form of a box-like structure having a plurality of recesses for slidably receiving and holding a single (replacement) cathode cartridge 617 and a plurality of (charged) metal-fuel cards 613 for use within the FCB power producing module of FIG. 1B. The storage container 636 can be made from plastic or other non-conductive material. Each metal-fuel card can be package within a nonconductive foil or like packaging material to prevent oxidation or contact with the environment prior to loading within the FCN module. Similarly, the replacement cathode cartridge can be packaged in a like material to prevent evaporation of the electrolyte impregnated within the cathode structure.

In FIGS. 5A and 5B another type of card or cartridge holder is shown in the form of a wallet-like structure 638 having a plurality of pouches for receiving/holding a cathode cartridge 617 and a plurality of metal fuel cards 613. The card holder can be folded as shown in FIG. 5B and carried in one's pocket, brief case or tote bag.

The components shown in FIGS. 1A through 5B form a novel system and method of generating electrical power for use in various types of devices. In accordance with the principles of the present invention, a metal (e.g. zinc) fuel card 613 is removed from its holder and inserted into the FCB power generation module so that it is disposed between the cathode cartridge 617 and the anode contacting structure 622 associated with the upper housing portion of the module. Thereafter, the FCB power generation module 611 is then placed in the battery compartment 612 of a power consuming device, e.g. mobile phone as shown in FIGS. 1A and 1B. When the metal-fuel card is discharged, the FCB power generation module is removed from the phone and the metal-fuel card is extracted and discarded. Another metal-fuel card is then removed from its storage container or holder, as shown in FIGS. 4 through 5B, and inserted into the FCB module 611 which is then reinserted into the battery compartment 612 of the phone. Each time a metal fuel card supply is exhausted, the FCB power generation module is removed and the metal fuel card discarded and a new metal fuel card installed. If necessary, a new cathode cartridge 617 is also inserted within the module along with a metal fuel card 613. It is expected that the life of a cathode cartridge (i.e. structure) should last at least 20 or more metal-fuel cards before the cathode cartridge requires replacement. The metalfuel cards of the present invention can be packaged within their holder/storage container and marketed in convenient packs of 10 to 20 along with the easy-to-use FCB power generation module 611 (and/or replacement cathode cartridge), thereby completely eliminating the need for bulky, inconvenient rechargers and expensive extra batteries.

Figure 6A:
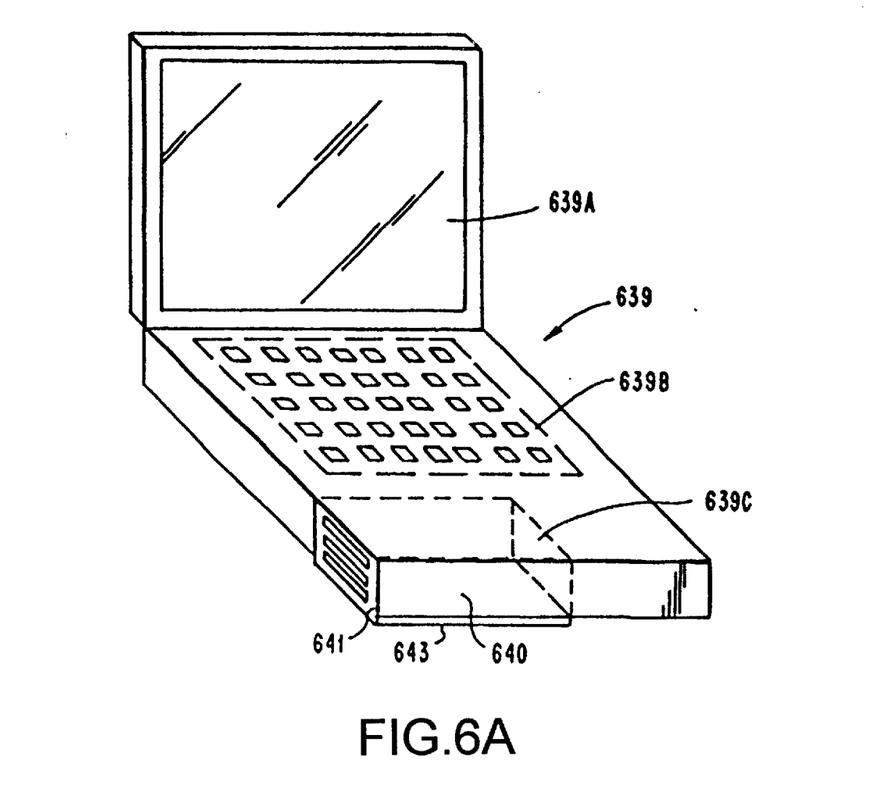
FIG. 6A is a perspective view of a laptop computer system which is adapted to receive electrical power produced from a metal-air FCB power producing module according to the present invention having a double-sided metal-fuel card disposed between a pair of replaceable cathode submodules (i.e. cartridges) in accordance with the present invention; to FIG. 6B is a perspective view of the metal-air FCB power producing module depicted in FIG. 6A, shown removed from the battery storage bay of the laptop computer system thereof.
Figure 6B:
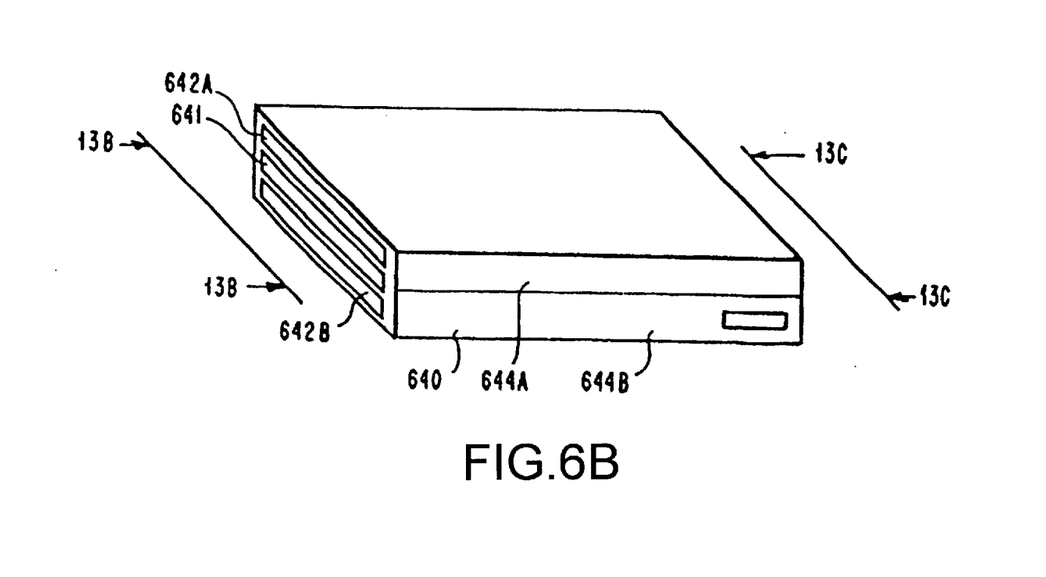

In FIG. 6A, there is shown another application of the FCB power generating modules hereof in a slightly higher power consuming device, e.g. a laptop computer system 639 having a display panel 639A, keyboard 639B, etc. Notably, this particular metal-air FCB producing module 640 includes both a Metal-Fuel Discharging Subsystem and a Metal-Fuel Recharging Subsystem. The rechargeable metal-air FCB power producing module 640 shown in FIGS. 6A and 6B is designed for insertion within the battery storage bay 639C of the laptop computer system but, of course, can be adapted to fit into a wide range of other types of power consuming devices. Aside from size, the primary difference between the FCB module shown in FIG. 6B and the FCB module shown in FIGS. 1B and 3A is that the FCB module of FIG. 6B employs a double-sided metal-fuel card 641 inserted between a pair of cathode cartridges 642A and 642B. Also, the anode-contacting structure is incorporated internally within each metal-fuel card, rather than externally thereto, as shown in FIG. 2A. The finer details of the FCB module of FIG. 6B will be described hereinbelow.

Alternatively, the FCB power producing module 640 may be modified to have only a Metal-Fuel Discharging Subsystem, and rely on a supply of metal-fuel cards to generate electrical power as electrical loading conditions demand. In either embodiment of the present invention, a plurality of extra metal-fuel cards 641 can be held within a storage compartment 643 as illustrated in FIGS. 6A and 6B. The storage compartment can be adhesively affixed to the exterior surface of the battery storage bay of the palmtop or laptop computer. In alternative embodiments of the present invention, the storage compartment 643 can be integrally formed within the power consuming device. As will be described below, this FCB producing module employs passive diffusion of ambient air ($O_2$)to the cathode structure, rather than actively forced or otherwise controlled air flow thereto during discharging operations. This approach simplifies the construction and cost of the FCB power producing module shown in FIG. 6B without compromising its performance in the power applications for which it has been designed.

Figure 7A:
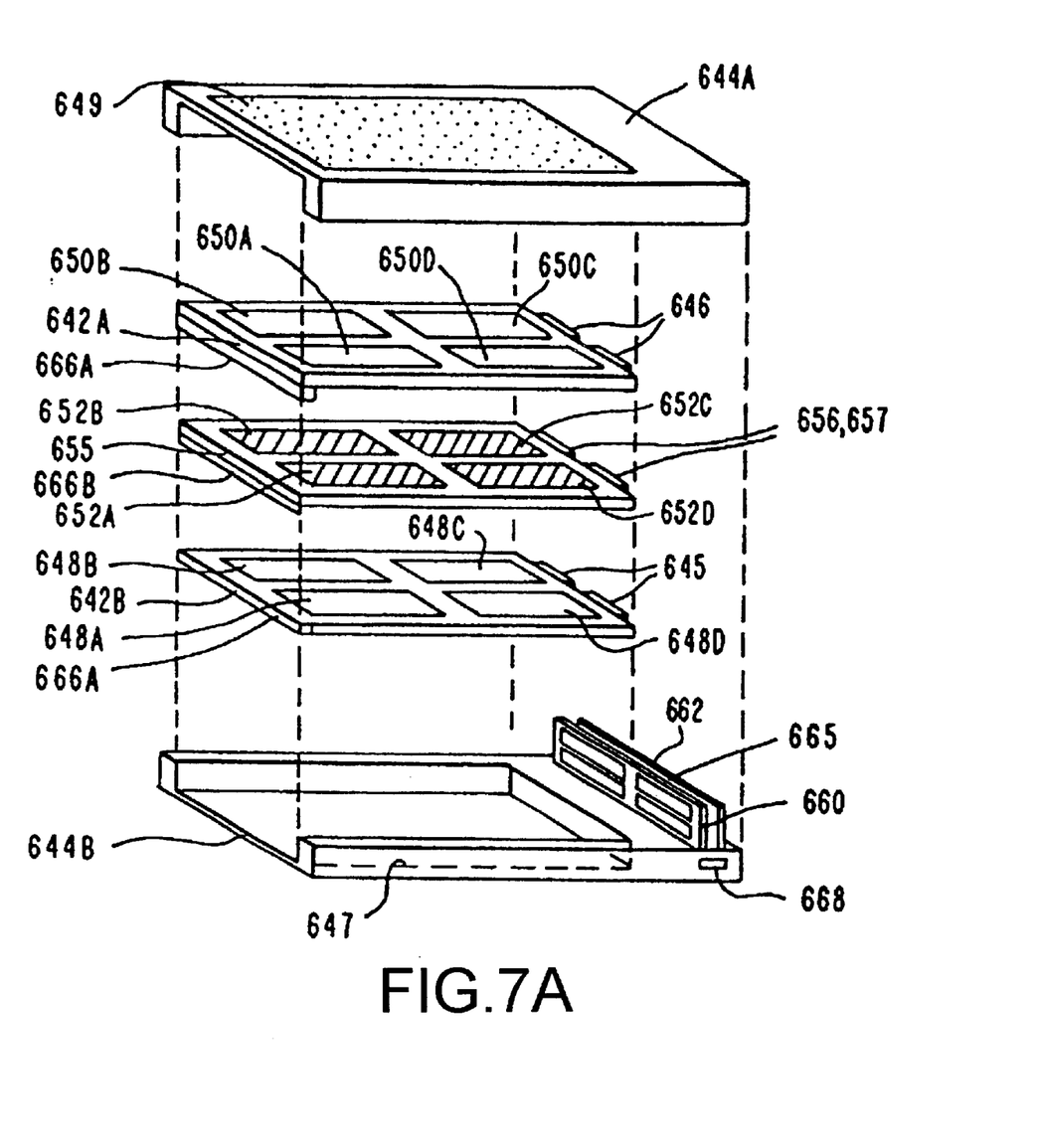
FIG. 7A is an exploded perspective view of the metal-air FCB power producing module of FIG. 6B, showing a pair of recesses formed in the upper and lower housing portions for slidable (or drop-in) receipt of pair of replaceable cathode submodules (i.e. cartridges), a recess formed between the cathode cartridges for slidable receipt of a double-sided metal-fuel card therewithin, and a pair of recesses formed in the lower housing portion for receipt of a pair of PC boards connected by way of a flexible circuit and interfacing with the cathode cartridges and metal-fuel card by way of electrical connectors.
Figure 7B:
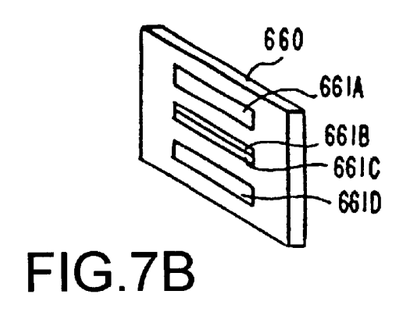
FIG. 7B is a perspective view of the first PC board mounted in the lower housing portion for interconnecting with the cathode cartridges and the double-sided metal-fuel card.
Figure 7C:
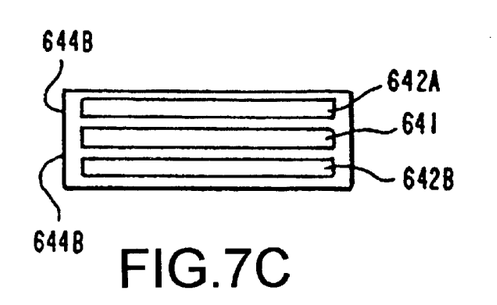
FIG. 7C is an elevated side end view of the FCB power producing module of FIG. 6B, showing the cathode cartridges and double-sided metal fuel card inserted with the module housing in a sealed manner.
Figure 7D:
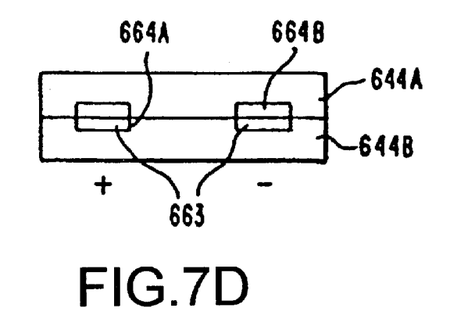
FIG. 7D is an elevated side end view of the FCB power producing module of FIG. 6B, showing the output power terminals adapted for electrically contacting respective input power terminals within the battery storage bay/compartment of the laptop computer or like device shown in FIG. 6A.
Figure 7E:
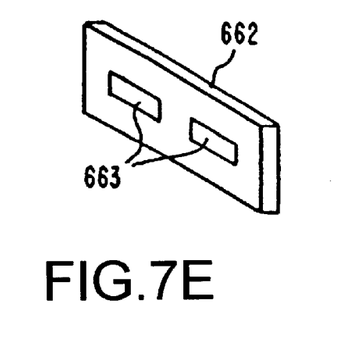
FIG. 7E is an elevated side end view of the FCB power producing module of FIG. 6B, showing the second PC board mounted therein having integrally-formed output power terminals for projection through a pair of apertures formed in the side wall of the lower housing portion shown in FIG. 4.
Figure 7F:
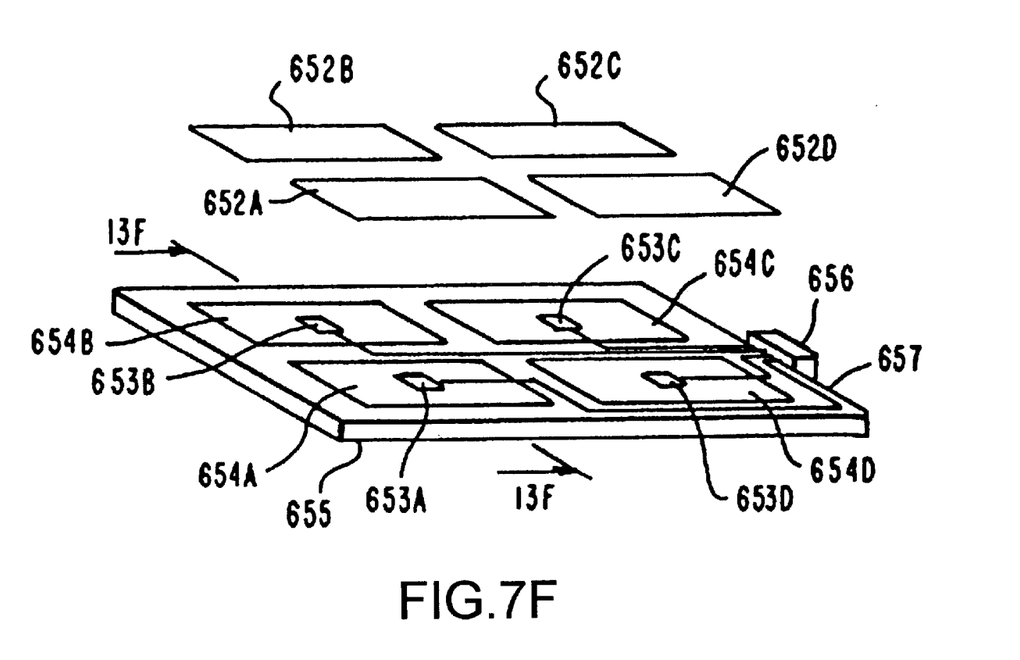
FIG. 7F is an exploded perspective view of a double-sided metal fuel card in accordance with the present invention, wherein an anode contacting element is mounted within a fuel element receiving recess and is electrically connected to an electrical connector formed at the edge surface of the metal-fuel card by way of an electrical conductor.
Figure 7G:
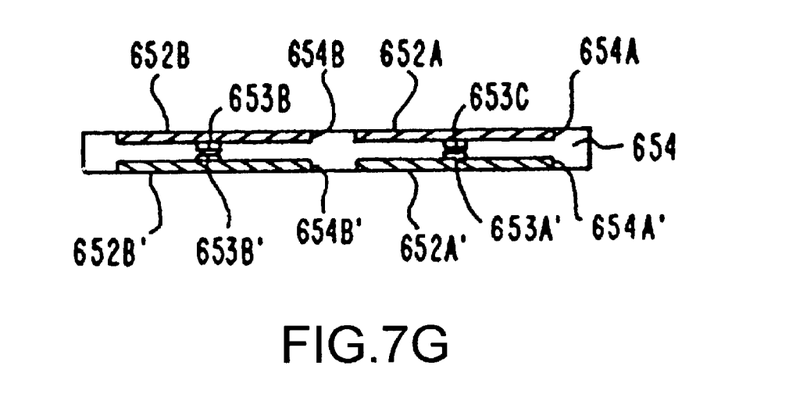
FIG. 7G is a cross-sectional view of the double-sided metal fuel card of FIG. 7A, taken along line 13F—13F shown in FIG. 7F, illustrating that a first set of four metal-fuel elements are mounted on a first side of the card structure, whereas a second set of four metal-fuel elements are mounted on the second side of the card structure, with an anode contacting structure (i.e. mechanism) provided on each side of the card in order to provide an electrically isolated current collecting pathway for each of the eight metal-fuel element/cathode pairs within the FCB power generating module.

As shown in FIGS. 7A through 7G, the FCB power producing module 640 comprises: an upper housing portion 644A (releasable) detachable from a lower housing portion 644B; a first four-element cathode structure (i.e. submodule or cartridge) 642B releasably inserted within a first recess formed in the lower housing portion 644B and terminating at a pair of first electrical connectors 645; a second four-element cathode structure (i.e. submodule or cartridge) 642A releasably inserted within a second recess formed in the upper housing portion 644A and terminating at a second pair of electrical connectors 646; a first air-pervious panel 647 formed in the side surface of the lower housing portion 644B for allowing ambient air to flow through the cathode elements 648A through 648D provided in first cathode cartridge 642B; an second air-pervious panel 649 formed in the bottom side surface of the upper housing portion 644A for allowing ambient air to flow through the cathode elements 650A through 650D provided in second cathode cartridge 642A ; a double-sided metal fuel card 641, illustrated in greater detail in FIGS. 7F and 7G, comprising (i) a first set of metalfuel elements 652A–652D disposed upon a first set of anode contacting elements 653A through 653D, mounted within a set of recesses 654A through 654D respectively, formed in the first surface of an electrically-insulated support structure 655 of thin dimensions and being electrically terminated at a pair of third electrical connectors 656 by way of a plurality of electrical connectors similar to the techniques known in the art, and (ii) a second set of metal-fuel elements 652A' through 652D' disposed upon a second set of anode contacting elements 653A' through 653D' mounted within a second set of recesses 654A' through 654D', respectively, formed in the second surface of electrically-insulated support structure 655 and being electrically terminated at a pair of fourth electrical connectors 657 by way of a plurality of electrical connectors; a first printed circuit (PC) board 660 mounted within the lower housing portion, for carrying electronic circuitry necessary to realize the various subsystems depicted in FIG. 7A required for the passive-air type rechargeable FCB module of FIG. 6A, as well as providing electrical connectors 661A through 661D for establishing electrical contact with the first, second, third and fourth electrical connectors 646, 656, 657, and 645 respectively, associated with the pair of cathode cartridges and the double-sided metal-fuel card; a second PC board 662 for supporting a pair of output power terminals 663 and electronic circuitry necessary for realizing an output terminal reconfiguration subsystem, an output power control subsystem and other subsystems; a pair of output power ports 664A and 664B for projection of power terminals 663 on second PC circuit board 662 through the lower housing portion; and a flexible circuit 665 for establishing electrical connections between first and second PC boards 660 and 662.

As shown in FIG. 7A, the first cathode cartridge 642B comprises a support frame with a plurality of recesses each having a perforated bottom support surface. Each cathode element and electrolyte-impregnated pad installed within a recess can be constructed as described hereinabove. The edge-located conductive elements associated with the first electrical connector 646 on the cathode cartridge 642B engage respective to the conductive elements associated with the first connector 661A provided on the first PC board 660 when the cathode cartridge is connected slidably (or drop-in) inserted into the first storage recess formed in the lower housing portion of the metal-air FCB power producing module. Similarly, the second cathode cartridge 642A comprises a support frame with a plurality of recesses each having a perforated bottom support surface. Each cathode element and electrolyte-impregnated pad installed in a recess can be constructed as described hereinabove. The edge-located conductive elements associated with the second electrical connector 645 on the cathode cartridge 642A engage respective to the conductive elements associated with the second connector 661D provided on the first PC board 660 when the second cathode cartridge is connected slidably (or drop-in) inserted into the second storage recess formed in the upper housing portion of the metal-air FCB power producing module.

Preferably, the outer edge portion 666A of the cathode cartridges and outer edge portion 666B of the metal-fuel card are each adapted to form a vapor tight seal with the module housing when the cartridges and metal fuel card are loaded within the module housing, as shown in FIG. 6B. This will prevent the electrolyte from evaporating prior to discharging operations. Optionally, a small reservoir of water or electrolyte make-up solution can be encapsulated within support plate of each cathode cartridge 642A and 642B and distributed to the electrolyte pads via microconduits formed along the cathode cartridge substructure. The electrolyte supply can protrude from the surface of the cathode cartridge surface, on the side thereof which contacts the metal-fuel card so that the metal fuel card exerts force on the protrusion when the metal fuel card is loaded in the FCB module. The protrusion structure can be similar to the bulbous structure provided in conventional devices used to package and dispense saline solution to human eyes by applying pressurized action upon the dispenser. As electrolyte is consumed during discharging operations, additional electrolyte is automatically withdrawn from the electrolyte reservoir within the cathode cartridge by way of pressure exerted upon the cathode substrate by the metal fuel card loaded within the FCB module. It is understood, however, that there are numerous other ways of providing an ionically-conducting medium between each cathode element and metal-fuel element within the FCB module. Such alternative techniques might include ionically-conducting polymers having a lifecycle engineered for 20 or so metal-fuel cards prior to requiring replacement. Even in such embodiments, it may be desired to supply a sufficient amount of $H_2O$ at the interface between the anode and ionically-conductive medium. The above-described fluid dispensing technique can be used in such instances.

As the FCB power generation module of FIG. 6A employs a multi-element cathode/anode construction, it is capable of producing electrical power over a range of different output voltages controlled by the output terminal reconfiguration subsystem thereof. In the preferred embodiment, the output voltage of the FCB producing module is selected by a multi-position switch 668 located on the exterior of the module housing, as shown in FIGS. 7A through 7D.

As illustrated in FIG. 7C, a plurality (in this case, a pair of them are shown) replacement cathode cartridges 642A and 642B and a plurality of metal-fuel cards 641 can be held within a storage device during packaging/mechanizing and post-purchase storage and use. The storage unit can be realized in the form of a box-like structure similar to that shown in FIG. 4, or as a wallet-like configuration as shown in FIGS. 5A and 5B. The holding device would have a plurality of recesses for slidably receiving and holding the replacement cathode cartridges as well as a plurality of (charged) metal-fuel cards for use within the FCB power producing module of FIG. 6B. The storage container can be made from plastic or other non-conductive material. Each metal-fuel card can be packaged within a non-conductive foil or like packaging material to prevent oxidation or contact with the environment prior to loading within the FCB power generation module. Similarly, the replacement cathode cartridge can be packaged in a like material to prevent evaporation of the electrolyte impregnated within the cathode cartridge.

In each of the above-described FCB power generation modules, the metal-fuel cards have been adapted into a recess formed between the anode contacting structure or cathode structure of the module (through an aperture in the module housing) and held in place under frictional forces similar to PCMCIA cards used in the computing art. It is understood that other mechanisms might be used to retain the metal-fuel cards within the modules (e.g. hinged housing designs, clamping structures, spring-biased retraction and protraction mechanisms and the like.)

Figure 8A:
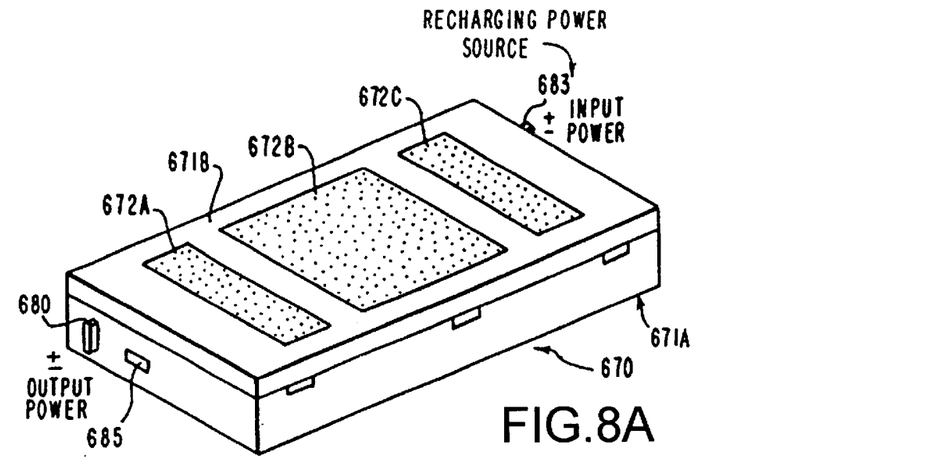
FIG. 8A is a perspective view of a rechargeable metal-air FCB power producing module according to another embodiment of the present invention, shown in its closed configuration and adapted for supplying electrical output power at a voltage level user-selected by a manual switch on the external surface of the module housing, or using automatic load sensing circuitry provided within the module.

In FIG. 8A, there is shown a rechargeable metal-air FCB power generation module 670 for use in higher power applications where it is desirable to provide the consumer the choice of being able to recharge the metal-fuel cards when required, or remove discharged fuel cards (for future recharging operations or discarding) and then replacing the cards with charged metal-fuel cards. Notably, the decision to recharge the metal-fuel cards or replace them is at the discretion of the consumer and will depend on the circumstances at hand.

In general, the FCB module of FIG. 8A comprises a rugged housing consisting of a lower housing portion 671A and an upper/cover housing portion 671B which can be hingedly connected to the lower housing portion, or slidably connected thereto. The cover portion of the housing has several air-pervious panels 672A, 672B and 672C for allowing diffusion of ambient air into the interior of the housing for consumption at the cathode structures, while preferably impeding the flow of moisture to the outside environment. Various types of vapor barrier/air-pervious materials, such as TYVEK material, can be used in construction of such panels.

Figure 8B:
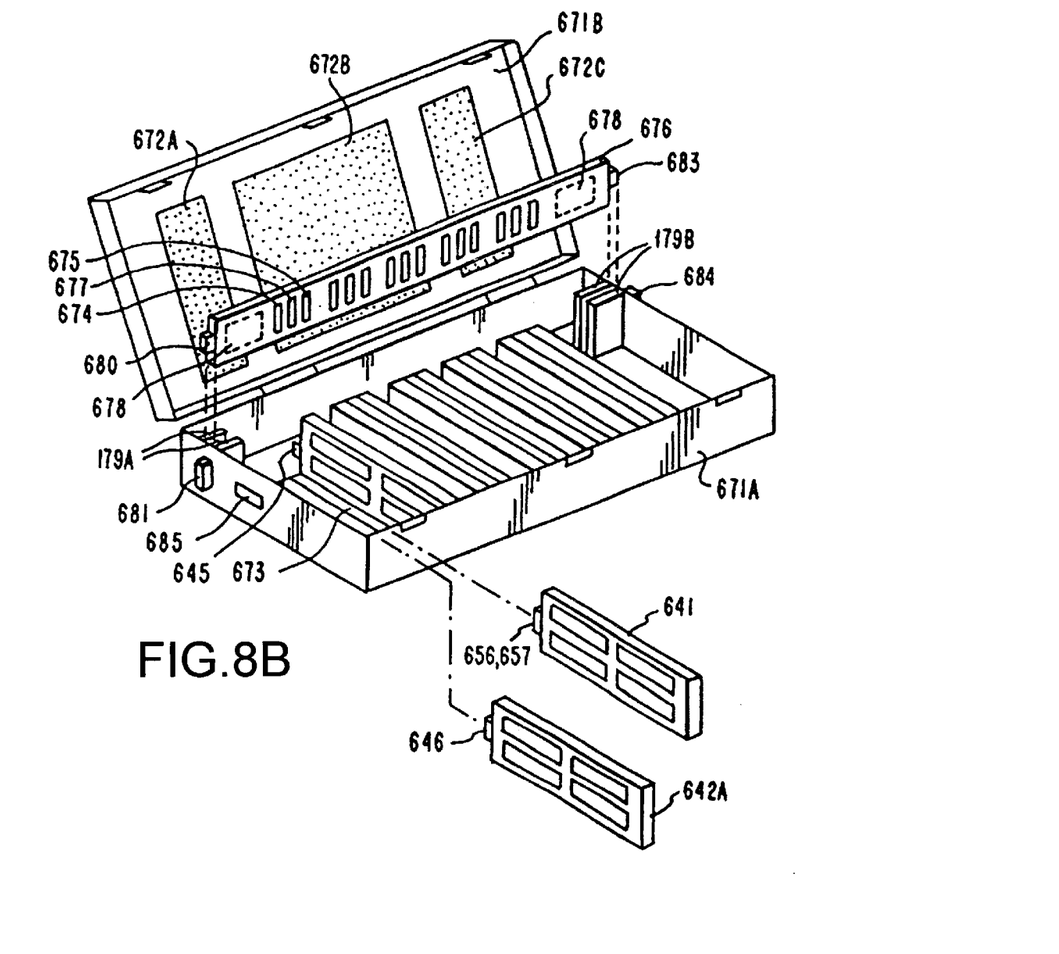
FIG. 8B is a perspective view of the rechargeable metal-air FCB power producing module of FIG. 8A, shown in its open configuration, and having five sets of discharge/recharge head subassemblies installed within the lower housing portion of the module in a snap-fit manner, so that electrical connections between the multi-element double-sided fuel card and multi-element cathode cartridges of each discharge/recharge head subassembly are automatically established with subsystems realized on a single mother-type PC board snap-fit mounted within the lower housing portion and securely held in place when the upper housing portion is hingedly closed down upon the lower housing portion of the module.

In the illustrative embodiment shown in FIG. 8B, five hybrid discharging/recharging head structure assemblies are releasably mounted within snap-in tracks 673 formed along the bottom surface of the lower portion of the housing. Each discharging/recharging head structure assembly comprises a pair of cathode cartridges 642A and 642B and a single double-sided metal fuel card 641, as provided in the FCB module of FIG. 6B. The cathode cartridges 642A and 642B are interconnected with electrical connectors on a PC board 676 also mounted within the lower portion of the housing perpendicular to the cathode structures and metal-fuel cards. The PC board also supports all electronic circuitry (e.g. 678) necessary to realize the various output voltage/current power control functions described in U.S. patent application Ser. No. 09/167,148, system in connection with discharging (and optionally recharging) modes of operation. Also, the double-sided metal fuel cards 641 are interconnected with electrical connectors 677 provided on the PC board 676 as shown. Each cathode structure and metal-fuel card can be easily removed by a simple plug-in operation, similar to installing random access memory (RAM) into a personal computer. Pairs of spaced apart brackets 179A and 179B ensure alignment of PC band 676 and the plug-in cards of cartridges between PC band 676.

As shown in FIGS. 8A and 8B, a pair of output power terminals 680 are provided on the PC board 676 and extend outside the module housing through aperture 681 for connection to the host device requiring electrical power at a specified output voltage. The physical configuration of the output power terminals 680 can be adapted to the particular application at hand. The output voltage across power output terminals can be selected by a multi-position switch 685 mounted on the exterior of the module housing.

A pair of input power terminals 683 are also provided on the PC board 676 and extend outside the module housing through aperture 684 for connection to a recharging power source (not shown) supplying DC electrical power at a specified input voltage. Typically, the recharging power source is realized by an AC-DC transformer well known in the art. Optionally, if the application demands, the AC-DC transformer can be incorporated directly into the FCB power generation module of FIG. 8A so that recharging operations can be carried out using 110 Volts (AC), without using an external AC-DC transformer. The physical configuration of the input power terminals can be adapted to the particular application at hand. When it is desired to recharge the metal-fuel cards loaded within the FCB power generation module, the user simply manually selects an externally located switch (not shown), and supplies electrical power to the input power terminals 683, thereby enabling the recharging mode of operation. Indicator lights can be provided to indicate the degree to which the metal-fuel cards have been recharged at any instant in time.

In alternative embodiments, the FCB module of FIG. 8A can be modified to use single-sided metal-fuel cards as disclosed in FIG. 2C. This would eliminate to the need to use a pair of cathode cartridges for each metal-fuel card, as required in FIG. 8A, in order to increase the output power capacity of the FCB module.

The above-described metal-air FCB power generation modules have immediate applications for portable electronics such as cellular phones and notebook computers. It will allow for 24 hours of continuous operation for notebooks, and even longer for portable phones. This zinc-air technology is completely scaleable, in different designs and geometries, from milliwatt watch batteries and portable electronics power supplies to multi-kilowatt applications in power tools, electric vehicles, and utility-scale power plants. This technology is inexpensive, safe and renewable encompassing a wide range of uses.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. A metal-air FCB electrical power producing module for supplying electrical power to a host system, said metal-air FCB power producing module comprising:

a module housing;

a multi-element discharging head enclosed within said module housing, having a plurality of cathode structures formed on a first unitary support structure spatially arranged with respect to a plurality of anode contacting elements formed on a second unitary support structure;

wherein said module housing has a first recess formed therein into which a metal-fuel card can be slid such that the metal-fuel card is operably disposed between said cathode structures and said anode contacting structures for discharging; and wherein said module housing has a pair of electrical terminals, in electrical connection with said multi-element discharging head, for contacting the power terminals of a host system.

2. A metal-air FCB electical power producing module comprising:

a housing;

a multi-element cathode structure insertable within a recess formed in said housing and having a plurality of current collecting conductors terminating in a first electrical connector;

an air-pervious aperture formed in at least one surface of said housing for allowing ambient air to passively flow through a plurality of cathode elements provided in said multi-element cathode structure;

a multi-element anode contacting structure integrally formed with said housing, and including a plurality of electrical contacts which are in electrical communication with the electrical conductors associated with a second electrical connector;

a metal fuel card for carrying a plurality of metal fuel elements upon a support structure and allowing said plurality of electrical contacts associated with said anode contacting structure to engage said plurality of metal-fuel elements, respectively, when said metal-fuel card is slid within a recess formed in said housing between said anode contacting structure and said multi-element cathode structure; and a pair of output power terminals extending through said housing and in electrical communication with said first and second electrical connectors, for providing electrical power to an external load.

3. The metal-air FCB power producing module of claim 2, wherein said multi-element cathode structure is releasably inserted within said housing and can be replaced as required by its continued use in discharging operations.

4. The metal-air FCB electrical power producing module of claim 2, which further comprises an output voltage controller for producing electrical power over a range of different output voltages.

5. The metal-air FCB electrical power producing module of claim 4, wherein said output voltage controller comprises circuitry carried on one or more PC boards mounted within said housing, wherein said circuitry is operably coupled between said fist and second electrical connectors and said pair of output power terminals, and wherein said one or more PC boards are substantially perpendicular to said multi-element cathode structure and said multi-element metal-fuel card when said multi-element metal-fuel card is inserted within said metal-air FCB module.

6. The metal-air FCB electrical power producing module of claim 2, which further comprises one or more printed circuit (PC) boards mounted within said housing for carrying electronic circuitry for realizing power regulation functions within said metal-air FCB electrical power producing module and supporting electrical connectors for establishing electrical contact with the first and second electrical connectors associated with said multi-element cathode structure and said multi-element anode contacting structure.

7. A metal-air FCB electrical power producing module comprising:
    a housing;
    a first multi-element cathode structure insertable within a first recess formed in said housing and having a first plurality of current collecting conductors terminating in a first electrical connector;
    a second multi-element cathode structure insertable within a second recess formed in said housing and having a second plurality of current collecting conductors terminating in a second electrical connector, said first and second multi-element cathode structures substantially parallel to each other when installed within said housing;
    an air-pervious aperture formed in at least one surface of said housing for allowing ambient air to passively flow through a first plurality of cathode elements provided in said first multi-element cathode structure and through a second plurality of cathode elements provided in said second multi-element cathode structure;
    a metal fuel card insertable within a recess formed between said first and second multi-element cathode structures, and carrying a first plurality of metal fuel elements supported upon a first side of a support structure and establishing electrical contact with a first plurality of electrical conductors terminating in a third connector mechanism formed on said support structure, and also a second plurality of metal fuel elements supported upon a second side of said support structure and establishing electrical contact with a second plurality of electrical conductors terminating in said third connector mechanism; and
    a pair of output power terminals extending through said housing and in electrical communication with said first and second electrical connectors associated with said first and multi-element cathode structures, and said third connector mechanism associated with said metal-fuel card when said metal fuel card is inserted within the recess provided within said housing, for providing electrical power to an external load.

8. The metal-air FCB electrical power producing module of claim 7, further comprising one or more printed circuit (PC) boards mounted within said housing for carrying electronic circuitry for realizing power regulation functions within said metal-air FCB electrical power producing module and supporting electrical connectors for establishing electrical contact with said first and second electrical connectors associated with said first and multi-element cathode structures, and said third connector mechanism associated with said metal-fuel card when said metal fuel card is inserted within the recess provided within said housing, and wherein said one or more PC boards are substantially perpendicular to said first and second multi-element cathode structures and said metal-fuel card when said metal-fuel card is inserted within said metal-air FCB module.

9. The metal-air FCB power producing module of claim 7, which further comprises means for producing electrical power over a range of different output voltages.

10. The metal-air FCB power producing module of claim 7, which further comprises a switch located on the exterior of said housing for selecting said output voltage from said range of different output voltages.

11. The metal-air FCB electrical power producing module of claim 7, which further comprises one or more printed circuit (PC) boards mounted within said housing for carrying electronic circuitry for realizing power regulation functions within said metal-air FCB electrical power producing module and supporting electrical connectors for establishing electrical contact with said first and second electrical connectors associated with said first and multi-element cathode structures, and said third connector mechanism associated with said metal-fuel card when said metal fuel card is inserted within the recess provided within said housing.

12. A cathode structure for use in a FCB electrical power generation module having a housing and a recess formed in said housing, said cathode structure comprising:
    a support structure supporting a plurality of cathode elements thereon; and
    a plurality of current collecting conductors in electrical contact with said cathode elements and terminating in an electrical connector attached to said support structure,
        wherein said cathode elements, support structure, conductors and electrical connector of said cathode structure are insertable within said recess formed in said housing.

13. A metal fuel card for use in an FCB electrical power generation module having first and second multi-element cathode structures and having a recess formed between said first and second multi-element cathode structures, said metal fuel card comprising:
    a first plurality of metal fuel elements supported on a first side of a support structure that are operably aligned with elements of said first multi-element cathode structure when the card is inserted into said recess;
    a second plurality of metal fuel elements supported on a second side of said support structure that are operably aligned with elements of said second multi-element cathode structure when the card inserted into said recess; and
    first and second sets of electrical contacts integrated with said support structure for providing electrical communication between an external load and said first plurality of metal-fuel elements and said second plurality of metal-fuel elements, respectively, when the card is inserted into said recess during discharging operations.

14. A FCB electrical power generation module comprising:
- a housing;
- first and second multi-element cathode structures disposed in said housing;
- a recess formed between said first and second multi-element cathode structures; and
- a metal-fuel card insertable within said recess and having
    - a first plurality of metal fuel elements supported on a first side of a support structure that are operably aligned with elements of said first multi-element cathode structure when the card inserted into said recess,
    - a second plurality of metal fuel elements supported on a second side of said support structure that are operably aligned with elements of said second multi-element cathode structure when the card inserted into said recess, and
    - first and second sets of electrical contacts integrated with said support structure for providing electrical communication between an external load and said first plurality of metal-fuel elements and said second plurality of metal-fuel elements, respectively, when the card is inserted into said recess during discharging operations.

* * * * *